United States Patent [19]
Fiebig

[11] Patent Number: 5,291,998
[45] Date of Patent: Mar. 8, 1994

[54] REUSABLE STACKABLE HOLDER FOR FLANGED ARTICLES, ESPECIALLY ELECTRICAL LAMPS

[75] Inventor: Werner Fiebig, Munich, Fed. Rep. of Germany

[73] Assignee: Patent-Treuhand-Gesellschaft F. Elektrische Gluehlampen mbh, Munich, Fed. Rep. of Germany

[21] Appl. No.: 21,788

[22] Filed: Feb. 24, 1993

[30] Foreign Application Priority Data

Apr. 6, 1992 [DE] Fed. Rep. of Germany ....... 9204751

[51] Int. Cl.⁵ ............................................. B65D 85/42
[52] U.S. Cl. ................................. 206/419; 206/421; 206/562; 206/563; 206/503
[58] Field of Search ............... 206/418, 419, 420, 421, 206/562, 563, 564, 503

[56] References Cited

U.S. PATENT DOCUMENTS

| | | | |
|---|---|---|---|
| 3,191,791 | 6/1965 | Jackson | 206/503 |
| 3,771,646 | 11/1973 | Mascetti . | |
| 4,068,760 | 1/1978 | Johnson, Jr. | 206/564 |
| 5,011,011 | 4/1991 | Kidd | 206/564 |
| 5,106,297 | 4/1992 | Discko, Jr. | 206/564 |

FOREIGN PATENT DOCUMENTS

| | | |
|---|---|---|
| 7832926 | 3/1979 | Fed. Rep. of Germany . |
| 1514212 | 2/1968 | France . |
| 2158413A | 11/1985 | United Kingdom . |

*Primary Examiner*—David T. Fidei
*Attorney, Agent, or Firm*—Frishauf, Holtz, Goodman & Woodward

[57] ABSTRACT

To permit reuse of shipping boxes and shipping holders for elongated articles having a transverse flange, particularly automotive-type halogen lamps, a stackable carrier plate (1) is formed with article receptors (2) which each include an engagement surface (4) which is tilted by an acuate angle ($\alpha$) of, for example, about 13° with respect to the major plane of the plate. The engagement surface is apertured so that the articles can hang at the receptors, with the flange engaging the engagement surface, the angle being selected to place the elongated portion (3b, 3e) of the articles below the plate between the elongated portion (3d) of the article which is above the engagement surface of a lower plate (1') in the stack. This permits spacing the plates above each other at a distance which is less than the length of the articles, for example by providing spacing ribs or walls, preferably fitting into depressions formed at a next adjacent upper or lower plate, and so arranged that the plates can be placed in stacked position above each other only in a unique orientation to provide for placement of the articles in adjacent stacked plates in non-interfering positions. Depending hold-down projections (7) are formed on the lower side of the plates to engage the upper side of the flange of a plate therebelow to ensure positive holding of the plates.

17 Claims, 4 Drawing Sheets

5,291,998

REUSABLE STACKABLE HOLDER FOR FLANGED ARTICLES, ESPECIALLY ELECTRICAL LAMPS

FIELD OF THE INVENTION

The present invention relates to a reusable or multi-use stackable article holder, and more particularly to a holder plate adapted to be placed into a carrier or container together with a multiplicity of similar holder plates, in which each one of the holder plates retains a plurality of elongated, usually essentially cylindrical articles with an intermediate flange, for example automotive-type halogen incandescent lamps, in which the flanges are positioning flanges to locate the lamps in predetermined position within a reflector.

BACKGROUND

Lamp holders to retain a plurality of automotive-type incandescent lamps are known, see for example the referenced German Utility Model GM 78 32 926. This known transportation container has an essentially box-like carrier, with a base plate and a top plate, between which a plurality of lamp holder plates are fitted. The lamp holder plates are formed with a plurality of essentially rectangular holes into which the lamps can be inserted, retained in the openings by the laterally projecting flanges. Thus, the lamps hang in the openings by their own weight. To position the lamps, the plates are further formed with small circular openings offset from the square openings to receive the tips of the lamp from another holder plate, located above any specific one.

The structure, as designed, is intended to be made of cardboard, corrugated board or the like, easily made by punching the board.

Cardboard carriers have the disadvantage that they can be used only once, and, after use, are discarded. This increases trash which must be removed or results in air pollution, if incinerated. Numerous environmental protection laws require re-use of packages, and particularly of shipping containers.

THE INVENTION

It is an object to provide a reusable carrier, and especially a reusable carrier plate to hold a plurality of flanged, essentially cylindrical or elongated articles which, additionally, is smaller than article carriers of similar capacity previously used, permits automatic insertion of the articles and, primarily, can be used and frequently re-used.

Briefly, the carrier plates are intended for stacking in a box-like carrier or holder and, each, are formed with article receptors which have an article engagement surface, to be engaged by the flanges of the articles, which engagement surface is inclined at an acute angle with respect to the major plane of the carrying plate, the acute angle being selected to place the elongated portion of the articles depending beneath the engagement surface between the elongated portion of the article which is above the engagement surface, that is, above the flange of a next adjacent lower carrier plate. Spacing means are provided, preferably formed directly on the carrier plate, to space the carrier plates from each other, when stacked in the box-like carrier holder; the spacers, preferably, provide a projection-and-recess interlock, so that, even outside of the box-like holder, a stable stack is provided.

The holder is particularly applicable for holding small electric lamps, such as halogen lamps intended for use in automotive vehicles, that is, formed with a positioning or locating disk intermediate of the entire lamp, to position the filament of the lamp accurately with respect to a reflector in the automotive vehicle.

In accordance with a feature of the invention, the holder plates are made of a sturdy plastic material, to permit stacking of a plurality of holder plates, with the lamps therein, one above the other, each lamp hanging through the respective receptor. The engagement surfaces of the receptors, which are inclined with respect to the major plane of the, in use usually horizontally placed carrier plate, positions the lamps in the carrier plates at an inclination which permits reduction of the stacking height of two carrier plates, one above the other, to a dimension which is less than the longitudinal dimension of the article, that is, the lamps, for example, as such. Thus, a larger number of lamps than heretofore possible can be transported within a given space.

In accordance with a preferred feature of the invention, the receptors include additional support elements which are matched to the dimension of the flanges of the articles and engage these flanges of a lower holder plate, so that the lamps are placed in a defined position on the lower plate. This also permits automatic feeding and placement of the lamps by an automatic packaging machine. Preferably, two oppositely positioned recesses are formed adjacent the engagement surface, recessed into the surface of the holder plate, which permits engagement of the lamps by gripping pincers of an automatic insertion machine, by permitting enlargement with the flanges of the lamps.

To ensure that the holder plates are properly oriented with respect to each other, hand grips and stacking projection-and-recess elements are provided and positioned non-symmetrically, with respect to the dimensions of the stacking plates. Thus, placement of a stacking plate above another one with wrong orientation, so that the inserted lamps might interfere with each other, is reliably prevented.

The lamps can be cleaned while being retained in the box-like carrier when, in accordance with a further feature of the invention, the holder plates are formed with drainage openings so that, when the lamps are placed in the carrier plates, and the carrier plates inserted in the holder carrier, the entire assembly and all the lamps therein can be flushed with a cleaning fluid, thus permitting easy cleaning of the lamps, while positively seated and retained in the holder plates.

DRAWINGS

DETAILED DESCRIPTION

Figure 1:
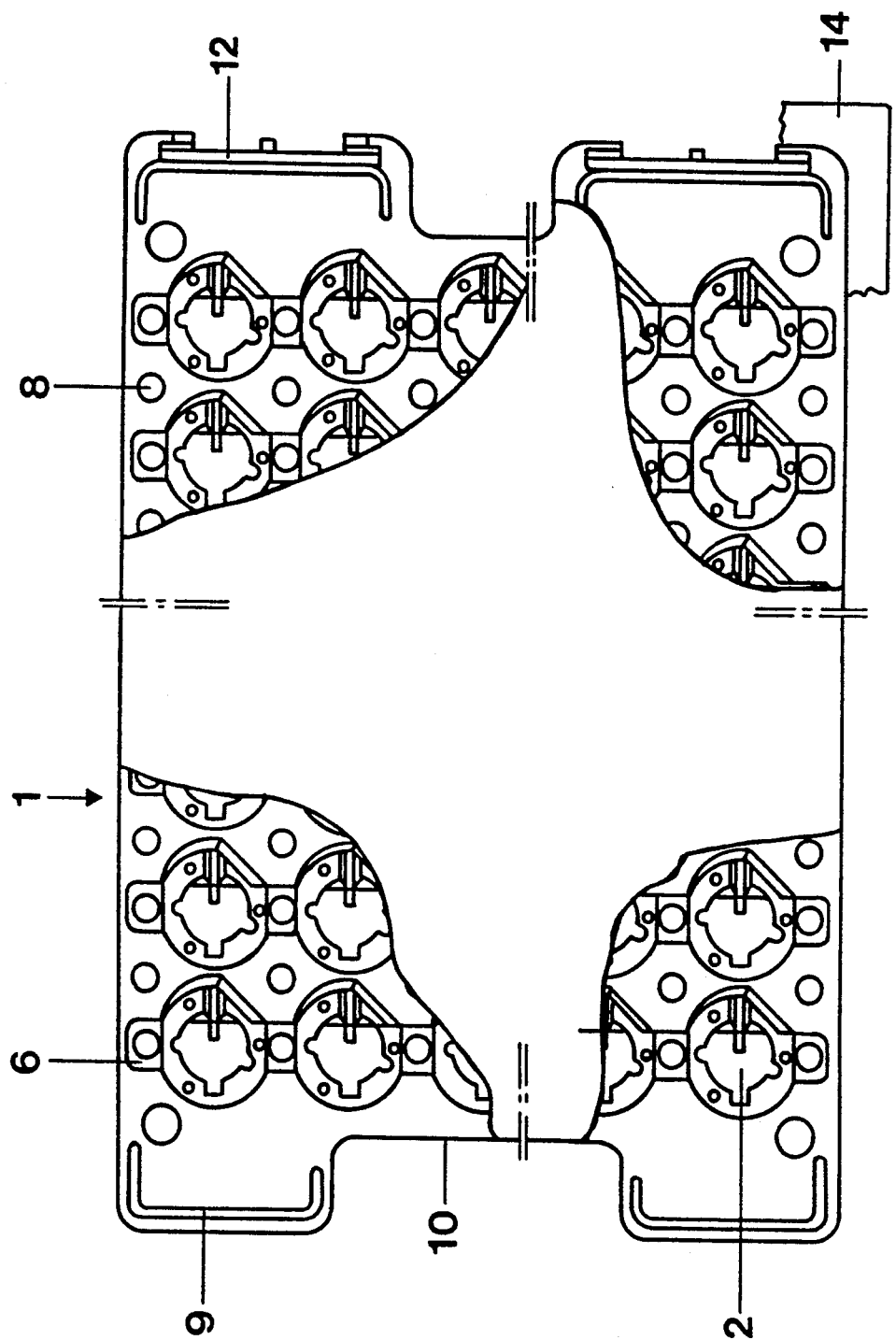
FIG. 1 is a partly broken-away top view of a holder plate in accordance with the present invention before insertion of lamps therein.

The holder plate and holding arrangement will be described in connection with H1 halogen incandescent lamps, best seen in FIG. 4, although, of course, the invention is not restricted to holding only such lamps. The lamps 3 (FIG. 4) have a glass bulb 3b, and a base sleeve 3e, extending from the bulb 3b. A filament 3f is located within the bulb 3b. A transversely extending flange 3a is fitted to the base sleeve 3e, which extends to a base terminal 3d. Positioning bumps or projections 3c are formed on the flange 3a. These positioning bumps may be formed by rivets on the centering and positioning flange 3a.

Figure 4:
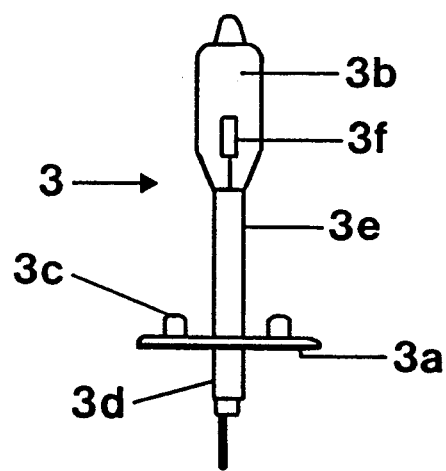
FIG. 4 is a highly schematic side view of an H1 halogen incandescent lamp.

The holding plate 1 is best seen in FIG. 1, which illustrates a top view of the holding plate specifically adapted to the H1 halogen incandescent automotive lamp, shown in FIG. 4. The holding plate 1 is an injection-molded structure made of sturdy plastic material. A plurality of such plates 1 can be stacked above each other, and retained in an essentially box-like transport carrier 14, of which only a corner portion is shown, highly schematically, in FIG. 1. The transport carrier 14, typically also of sturdy plastic material, retains a plurality of carrier plates 1 therein. The transport carrier may have solid side walls, or may be made of plastic grid or mesh or vertical truss construction. The vertical spacing between two carrier plates 1, that is one above the other, is less than the length dimension of the lamps 3.

Figure 2:
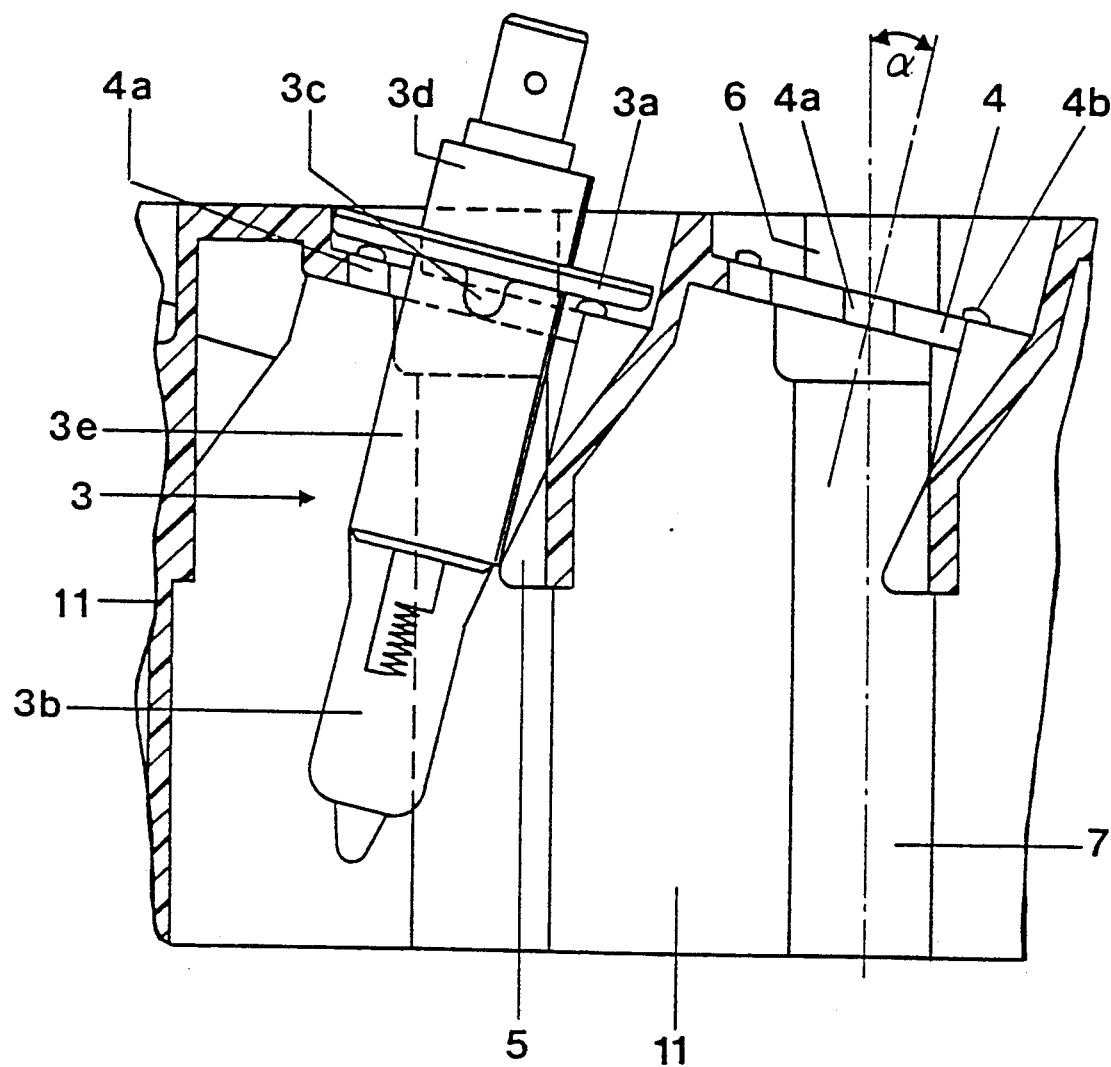
FIG. 2 is a partial longitudinal part-sectional view of the holder plate, and particularly illustrating two receptors, with a lamp inserted in one of the receptors.
Figure 3:
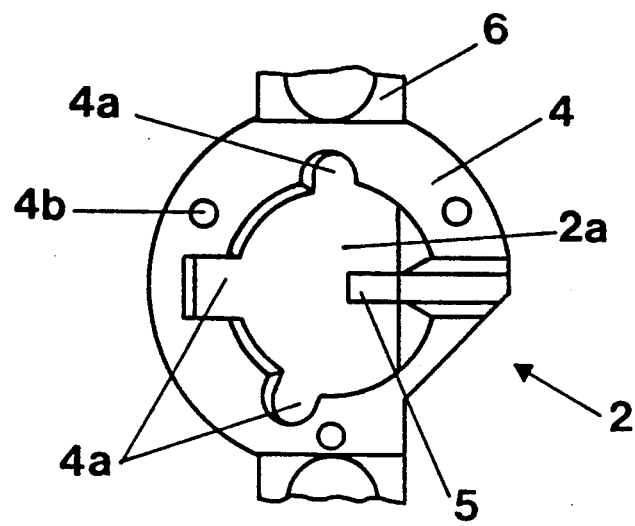
FIG. 3 is a detailed top view of the receptor of the holder plate.

Each holder plate 1 has 80 receptors 2 for the lamps 3. The receptors are located in a horizontal plane, corresponding to the major plane of the plate 1, in rows and columns. The receptors 2, see FIGS. 2 and 3, have an engagement surface 4 with a plurality of engagement projections or bumps 4b. The engagement surfaces are recessed in the upper side of the plate 1.

In accordance with a feature of the invention, the engagement surfaces form an angle $\alpha$ with respect to the horizontal or major plane of the upper surface of the plate 1. This angle is an acute angle and, preferably, is about 13°. The contour and the dimension of the engagement surface 4 is matched to the form, shape and dimension of the centering flange of the article to be retained, in this case the centering flange 3a of the lamp 3.

The lamps 3 hang in the receptors 2, so that the bulb 3b extends downwardly below the receptors. The receptors 2 are formed with a central opening 2a to receive the lamps. The flange 3a engages the engagement projections 4b of the surface 4. The surface 4, additionally, is formed with recesses 4a to receive the rivets or locating projections 3c on the centering flange 3a of the lamp.

Figure 2A:
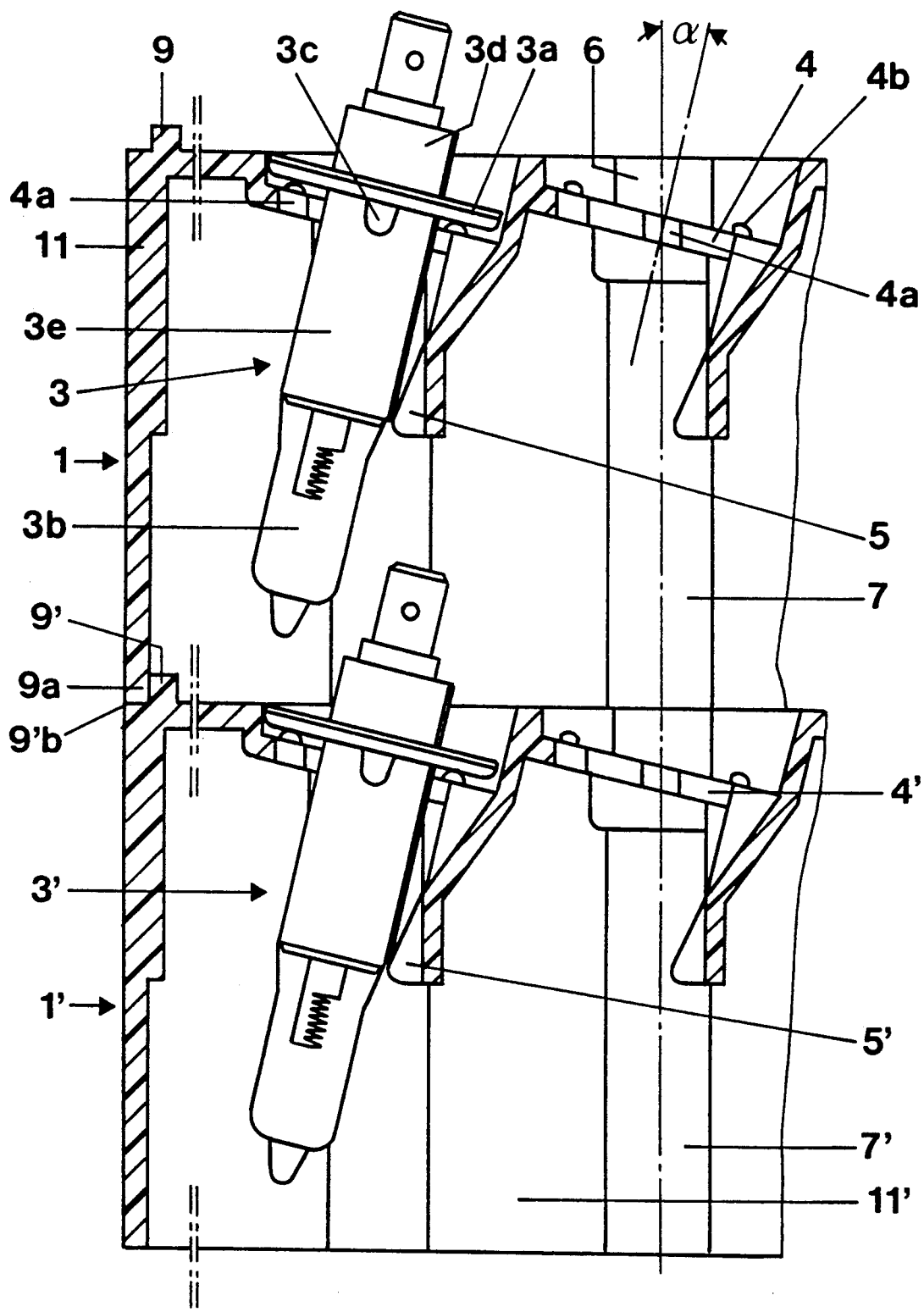
FIG. 2A shows two holder plates as seen in FIG. 2, to a different scale, stacked above each other, to illustrate the placement of the lamps in the stacked holders.

The angle of inclination a, is so selected that the lamp bulbs 3b of the lamps fitted into an upper holder plate 1 extend in the space between the base ends 3d of lamps in the next lower holder plate—see FIG. 2A. In FIG. 2A, the lower holder plate 1' retains the lamps 3' engaging the engagement surfaces 4'.

The receptors 2, each, are formed additionally with a depending support element 5, which provides for lateral support of the lamps 3, and are dimensioned and shaped to engage the base sleeve 3e of the H1 lamps. To permit engaging the lamps with pincers or gripper tongs of automatic insertion machinery, the receptors are additionally formed with oppositely located recesses 6 of essentially rectangular shape. These recesses permit gripper tongs or pincers of an automatic insertion machine to engage the flange of the respective lamps 3, and grip beneath the flange 3a of the respective lamp, in order to provide for reliable insertion or, respectively, reliable gripping for removal.

The underside of the carrier plate 1 is formed with a plurality of tubular holders 7, which prevent drop-off of the lamps 3 from the receptors 2 in case the stack should be turned upside-down. The holders 7 are located beneath the recesses 6, see FIG. 2A. When the plates 1, 1' are stacked above each other, the hold-down tubes 7 of the upper holder plate 1 will be positioned immediately above the centering flange 3a of the lamp 3 in the next lower holder plate 1'. The elements in the lower plate 1' are identical to those in the upper plate 1, and the same reference numerals have been used, with prime notation. The tubular hold-down elements 7 have an additional function in that, together with drainage holes 8 (FIG. 1), they direct cleaning fluid which can be splashed over the stacked holder plates, with the lamps therein, so that wet cleaning of the lamps 3, while inserted in the holder, is entirely feasible and the entire group of lamps in the respective holder plates can be cleaned at once, with reuse of the cleaning fluid by capturing it from the drainage holes 8.

The plastic holder plates 1 have essentially rectangular cross section; in plan view, they are also essentially rectangular. The length of the holder plate is about 32 cm, and the width is approximately 24 cm, for example 24.1 cm. The upper side of the holder plate 1 has interlocking or interengaging stacking tongues and grooves 9 therein. To ensure that stacked holder plates 1 are always placed in alignment and to prevent stacking reversed by 180° of respective holder plates, the stacking interengaging regions 9 are located non-symmetrically, as seen in FIG. 1. FIG. 2A shows a groove 9'b in the upper wall of the lower plate 1', engaged by a portion of the side wall 9a of the upper plate 1. Hand-gripping recesses 10 are formed in the end walls of the plates, also of different sizes to prevent erroneous insertion.

The holder plates 1 are formed with depending side walls 11, located at the lower sides thereof and extending over the longitudinal sides and over to the stacking engagement projection-and- recess arrangement 9, 9a, 9b. They further extend over the facing sides of the carrier plate 1. The side walls 11, typically, have a height of about 5.5 cm. An insertion holder 12, for example for identification labels, shipping labels or the like, is placed at one of the facing or end walls, as seen in FIG. 1.

The invention is not limited to the example shown, nor to packaging of the particular lamp illustrated in FIG. 4. The carrier plate 1 may be used to transport various other articles, and especially articles having a centering flange or similar transversely extending flange element. Various lamps have such flanges; automotive vehicular lamps, such as the H4 and H7 lamps, are typical of lamps with flanged bases. It is only necessary to match the dimensions of the receptors 2 to the particular flanges used, if necessary formed with suitable recesses to accomodate projections in the flanges; additionally, the angle of inclination (I can be optimally arranged. This angle is dependent, essentially, on the length of the lamps, the diameter of the centering flanges, and the desired spacing of the plates above each other, as well as on the location of the flange with respect to the longitudinal extent of the article to be retained on the carrier plate.

Various changes and modifications may be made within the scope of the inventive concept.

A suitable plastic material for the carrier plates is polystyrene.

I claim:

1. A stackable carrier plate (1) for combination with an essentially box-shaped carrier holder (14), and for further combination with articles (3) having an elongated portion (3b, 3d, 3e) and a transverse flange (3a) intermediate the elongated portion to retain said articles on the carrier plate, said carrier plate (1) being adapted to be placed while essentially horizontal in stacked position with a further essentially identical carrier plate (1') in the essentially box-shaped carrier holder (14), each carrier plate (1) defining a major plane, an upper side, and a lower side, wherein, in accordance with the invention, the carrier plate (10) essentially consists of plastic material;

the upper side of the carrier plate is formed with article receptors (2), said article receptor being formed with an aperture (2a) and an engagement surface (4) surrounding the aperture, which engagement surface is dimensioned and shaped to be engaged by said transverse flange (3a) of the article, said engagement surface receiving the article in position in which the elongated portion of the article passes through the aperture (2a) in the engagement surface (4) and the flange (3a) engages the engagement surface, whereby the article will hang on the engagement surface;

said engagement surface (4) being located at an acute angle ($\alpha$) with respect to the major plane of the carrier plate, said acute angle ($\alpha$) being selected to place the elongated portion (3b, 3e) of the article depending beneath the engagement surface (4) between the elongated portion (3d) of the article which is above the engagement surface (4') of the further carrier plate (1') positioned below the carrier plate (1) from which the article (3) hangs; and spacing means (9) are provided, formed on at least one of said sides of the carrier plate for defining a stacking space between carrier plates stacked above each other, which stacking space is dimensioned to be less than the length of the articles (3).

2. The carrier plate of claim 1, wherein said receptors (2) are formed with oppositely positioned recesses (6) located adjacent the engagement surface (4) to permit introduction of grippers or pincers beneath the flange (3a) of an article on the receptor (2).

3. The carrier plate of claim 1, further including a depending support strip, (5) projecting from the receptors at the lower side of the plate and positioned for laterally supporting the article hanging from the support surface at said angle of inclination ($\alpha$).

4. The carrier plate of claim 1, wherein the engagement surface is contoured and dimensioned to closely surround, at least in part, the transverse flange (3a) of the article.

5. The carrier plate of claim 1, further including a plurality of holding posts (7) projecting from the lower side of the carrier plate (1), said holding posts being dimensioned and positioned such that any holding post bears against an article (3') positioned on the engagement surface of the further carrier plate (1') positioned beneath and stacked below the carrier plate (1).

6. The carrier plate of claim 1, wherein the carrier plate (1), in plan view, has an essentially rectangular aspect, and hand-hold recesses (10) are provided, located at two opposite side surfaces of the plate, the hand-hold recesses, respectively, being of different size or configuration.

7. The carrier plate of claim 1, wherein said spacing means comprise projection (9a) and recess (9'b) means, which are non-symmetrically located around the circumferential portions of the carrier plate to provide for stacking of carrier plates in the box-shaped carrier holder in unique stackable positions.

8. The carrier plate of claim 1, further including drainage openings (8) formed in the carrier plate (1) to permit drainage of a cleaning fluid for cleaning of articles located on the carrier plate stack by the cleaning fluid.

9. The carrier plate of claim 5, wherein the holding posts (7) are tubular hold-down elements.

10. The combination of at least two carrier plates (1, 1') forming said carrier plate and said further carrier plate stacked above each other, wherein each one of the carrier plates comprises the carrier plate claimed in claim 1, and wherein said spacing means include projection-and-recess means (9, 9a, 9'b) formed on each one of the carrier plates, and providing for interengaging fit of the spacing means at unique orientations of the stacked carrier plates.

11. The combination of claim 10, wherein said box-shaped carrier holder (14) is dimensioned for retaining said stack of carrier plates (1, 1').

12. The combination of claim 10, further including a plurality of holding posts (7) projecting from the lower side of the carrier (1) plate, said holding posts being dimensioned and positioned such that any holding post bears against an article positioned on the engagement surface of the further carrier plate (1') positioned beneath, and stacked below the carrier plate (1).

13. The combination of claim 10, wherein each one of said carrier plates is formed with drainage openings (8) to permit wet-cleaning of the articles retained in the stack of carrier plates (1, 1') while the stack of carrier plates (1, 1') with the articles thereon is retained in said wax-shaped carrier holder (14).

14. The carrier plate of claim 1, wherein the articles comprise halogen lamps.

15. The carrier plate of claim 1, wherein the articles comprise automotive halogen lamps.

16. The combination of claim 10, wherein the articles comprise halogen lamps.

17. The combination of claim 10, wherein the articles comprise automotive halogen lamps.

* * * * *